Nov. 30, 1937.   F. G. PURINTON   2,100,816
FASTENING DEVICE FOR LOCKING JUXTAPOSED MEMBERS TOGETHER
Filed April 15, 1936

Inventor.
Forrest G. Purinton
by Heard, Smith & Tennant
Attys.

Patented Nov. 30, 1937

2,100,816

UNITED STATES PATENT OFFICE 2,100,816

FASTENING DEVICE FOR LOCKING JUXTAPOSED MEMBERS TOGETHER

Forrest G. Purinton, Waterbury, Conn., assignor to The Patent Button Company, Waterbury, Conn., a corporation of Connecticut Application April 15, 1936, Serial No. 74,493

6 Claims. (Cl. 24—221)

This invention relates to improvements in fastening devices for releasably clamping together and locking a plurality of juxtaposed members.

More particularly the invention is a fastening device for locking to a body or base cover plates, such as those which cover the service openings in aeroplanes and the like.

The principal object of the invention is to provide a locking device which will be of relatively inexpensive construction and which will not only lock the parts against removal, but will also clamp the same together in such manner that they will not become loosened by vibration, or by accidental means.

These and other objects and features of the invention will more fully appear from the following description and the accompanying drawing and will be particularly pointed out in the claims.

Figure 1:
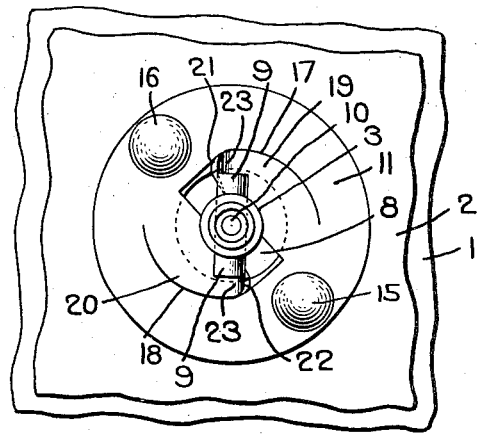
Fig. 1 is a plan view of the lock in position to secure a plurality of members, such as plates, together, the plates being broken away.
Figure 2:
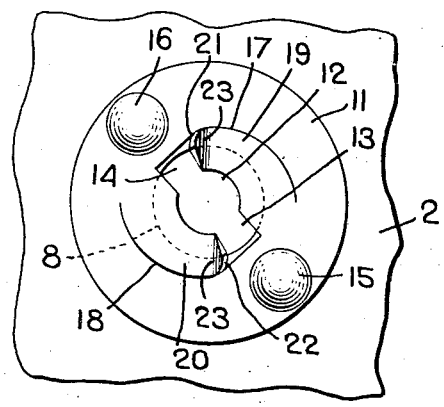
Fig. 2 is a view similar to Fig. 1 showing one of the locking members secured to one of the plates.
Figure 3:
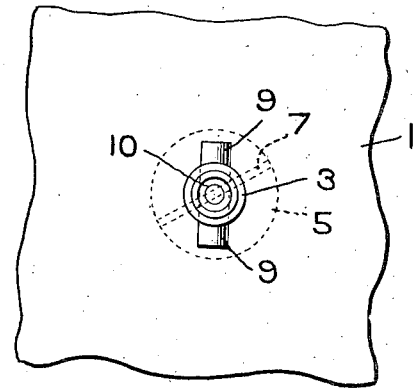
Fig. 3 is a plan view showing the cooperating locking element mounted in the other plate.
Figure 4:
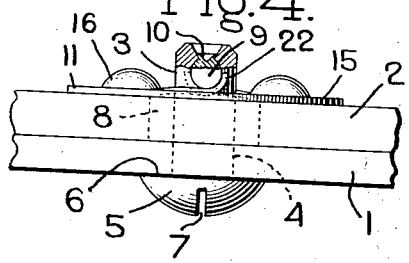
Fig. 4 is a view of the same mainly in elevation with a portion of the upper end of one of the locking members broken away to show the manner in which a lateral extension or cross pin is secured to it; and, Fig. 5 is a side elevation showing one of the plates with the other locking element secured to it.
Figure 5:
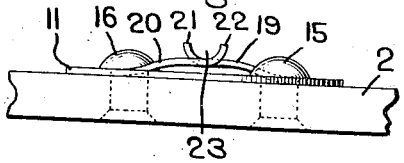

The locking device is illustrated in the accompanying drawing as securing together two members, such as plates, one of which may be termed the main plate 1, such as the side of an aeroplane, and the other member 2 a complementary plate such as a cover plate for the service opening of an aeroplane. Of course, the fastening device may be reversed in position depending upon which side the rotatable element of the locking device may be most conveniently manipulated.

The locking device comprises essentially two elements one of which preferably is in the form of a stud 3 which passes through and fits an aperture 4 in the plate 1 and is provided with a head 5 having a shoulder 6 which abuts against the face of the plate 1. The head 5 desirably is provided with means adapted to be engaged by a suitable tool. As illustrated, the head 5 has a slot 7 adapted to be engaged by a screw driver, but the head may be made of angular form adapted to be engaged by a wrench, or other suitable tool. The other member or plate 2 is provided with a relatively large aperture 8 adapted when the members 1 and 2 are in juxtaposed position to overlie the aperture 4 in the plate 1 and is of sufficient diameter to receive a lateral extension or cross pin secured in the other end portion of the stud 4.

The stud 3 is of sufficient length to extend through and beyond the opposite face of the member 2 and is provided with a transverse bore in which a cross pin 9 is fixedly secured. The cross pin 9 may be secured in place in any suitable manner. As illustrated the cross pin is provided with a tapering bore which intersects the transverse bore of the cross pin and the cross pin is expanded by a prick-punch to provide an annular extension 10 which fits tightly within the tapering axial bore of the stud.

The other locking element engages the outer face of the member or plate 2 and is provided with preferably resilient means to engage and hold the lateral extension or cross pin of the stud after the latter has been introduced through the member 2 and the cooperating locking elements relatively rotated through a portion, such as one-fourth of a single revolution.

As illustrated in the drawing the stud 3 is rotatably mounted in the member or plate 1 and the cooperating locking element fixedly secured to the opposite face of the member or plate 2, but obviously the stud may be rigidly secured in the member 1 and suitable means provided for rotating the complementary locking member relatively thereto.

In the particular construction shown in the drawing the complementary locking member comprises a washer 11 of resilient material having a central aperture 12 through which the stud 3 may be passed and provided with preferably diametrically opposite slots 13 and 14 through which the lateral extension or the cross pin 9 of the stud 3 may be introduced.

As illustrated, the washer 12 is fixedly secured to the plate 2 by rivets 15 and 16 and is provided with yieldable means to engage and hold the lateral extension or cross pin when the stud has been rotated through a predetermined portion of a revolution.

In the particular construction illustrated the washer is provided with slits 17 and 18 upon diametrically opposite sides of the slots 14 and 13 which extend from the slots in approximately concentric relation to the central aperture 12 of the washer, thereby providing spring sections 19 and 20 which are bent outwardly from the plane of the plate and desirably are provided with upwardly bent ends 21 and 22 adapted to limit the rotation of the cross pin of the stud and to provide sockets to receive the ends of the cross pin when the springs are depressed as the stud is rotated from its position of introduction through said predetermined portion of a revolution. The upwardly extending end portions 21 and 22 of the springs also serve to prevent the rotation of the stud and its cross pins in the reverse direction after the cross pins have been introduced through the slots 13 and 14.

The operation of the device is obvious. When the cover plate 2 has been superimposed upon the plate 1, as by the application of the cover plate to a service opening in an aeroplane, the aperture 8 in the plate 2 overlies the relatively smaller aperture 4 in the plate 1 and the stud 3 will then pass through the aperture 8 when it is turned to such position that its lateral extension or cross pin passes through the aperture 12 and slots 13 and 14 in the washer 11. The head 5 of the cross pin is then engaged by a screw driver, or other suitable tool, and the stud rotated through a predetermined portion of a single revolution, thereby causing the lateral extension or ends of the cross pin 9 to ride up upon the springs 19 and 20. The cross pin thus riding up upon the springs 19 and 20 depresses the springs and clamps the plates 2 firmly against the plate 1. When the rotation of the stud is arrested by the upwardly extending ends 21 and 22 of the springs 19 and 20, the downward flexion of the springs will produce a curve which will tend to hold the cross pin against reverse rotation unless and until the stud is rotated by the application of a suitable tool. Preferably the springs 19 and 20 are provided with depressions 23 adjacent the outwardly turned ends thereof to receive the cross pin when it has been turned through said predetermined portion of a revolution and to prevent reverse rotation of said stud unless manually manipulated. The locking device therefore not only serves to lock the parts together but by reason of the action of the springs 19 and 20 the plates are firmly clamped together in such manner as to prevent any vibration or sidewise movement of the plates relatively to each other. Relative sidewise movement of the plates is also prevented by reason of the fact that the end portion of the stud 3, which extends through the aperture 12, is engaged by diametrically opposite portions of the walls of the aperture.

While a plurality of spring members 19 and 20 are illustrated in the drawing, it is obvious that a single spring member may be employed having suitable means to engage and hold the lateral extension of the stud.

Of course, the stud 3 may be of angular cross section and mounted in a corresponding aperture in the plate 1, or may be otherwise rigidly secured to the plate 1, and suitable means provided for rotating the complementary locking device or washer, in which case the latter would not be rigidly secured to the other member or plate 2.

It will therefore be understood that the particular embodiment of the invention shown and described herein is of an illustrative character, and not restrictive, and that various modifications in form, construction and arrangement of parts may be made within the spirit and scope of the following claims.

Having thus described the invention, what is claimed as new and desired to be secured by Letters Patent, is:

1. A fastening device for releasably holding together two relatively movable members having apertures adapted to be superimposed comprising a stud rotatably fitting the aperture in one of said members and having at one end a relatively large head and adjacent its other end a lateral extension, the other member comprising a resilient locking device having a recess through which the stud and its lateral projection may be inserted and provided with a spring section having a free end partially severed from said locking plate and bent outwardly from the plane thereof and provided near its free end with a socket to receive the lateral extension of said stud when the stud is turned through a part of a revolution.

2. A fastening device for releasably holding together two relatively movable members having apertures adapted to be superimposed comprising a stud rotatably fitting the aperture in one of said members and having at one end a relatively large head by means of which it may be rotated and adjacent its other end a plurality of lateral extensions, the other member having secured thereto a resilient locking plate having an aperture fitting said stud with recesses extending therefrom through which the stud and its lateral projections may be inserted and having spring sections partially severed from said locking plate and bent outwardly from the plane of said plate and having free ends provided with sockets to receive the lateral extensions of said stud when the stud is rotated through a part of a revolution in the direction of said spring section, the ends of said spring serving to prevent reverse rotation of said stud.

3. A fastening device for releasably holding together two relatively movable members, one of which is provided with an aperture having a stud rotatably fitting therein and having at one end a relatively large head and adjacent the other end lateral projections, the other member having a relatively large aperture therein through which said stud and extensions may be inserted, and a locking plate of resilient material secured to said other member partially overlying the aperture in said other member and provided with a central aperture fitting said stud and laterally extending recesses through which the lateral projections of the stud may be inserted, spring sections partially severed from said resilient plate on lines extending rearwardly from opposite edges of said recesses and bent outwardly from the plane of said plate and having upturned free ends forming sockets adapted to arrest the rotation of said stud when engaged by the lateral extensions thereof.

4. A fastening device for releasably holding together two relatively movable inner and outer members comprising a stud rotatably fitting the outer member and of such length as to pass into the inner member and provided at one end with a head by means of which it can be rotated and at the other end with a plurality of projections adapted to enter an aperture in the inner member, a cooperating locking plate secured to the inner member having an aperture through which the end of said stud and its projections may pass and provided in proximity to said aperture with spring sections partially severed from said locking member having free ends overlying the aperture in said inner member and bent outwardly from the plane of said plate acting to hold said members together when the stud is inserted and rotated through a portion of its revolution, said springs being provided with sockets formed adjacent their ends to engage and releasably hold the projections of said stud.

5. A fastening device for releasably clamping and locking together two relatively movable members one of which is provided with a circular aperture and the other of which is provided with a relatively larger aperture comprising a stud rotatably fitting said circular aperture and of such length as to pass through the other member provided at one end with a head by means of which it can be rotated and at the other end with a cross pin adapted to pass through said larger aperture, a cooperating locking element comprising a washer of resilient material secured to said other member having a circular aperture and slots through which said stud and cross pin may pass, and provided in proximity to said slots with arcuate outwardly projecting springs partially severed from said washer and having outwardly curved end portions to engage and releasably to hold said cross pin and also acting to clamp said members together when said stud is rotated through a portion of a revolution relatively to its position when passing through the aperture and slots of said washer.

6. A fastening device for releasably clamping and locking together two relatively movable members one of which is provided with a circular aperture and the other of which is provided with a relatively larger aperture comprising a stud rotatably fitting said circular aperture and of such length as to pass through the other member provided at one end with a head by means of which it can be rotated and at the other end with a cross pin adapted to pass through said larger aperture, a cooperating locking element comprising a washer of resilient material secured to said other member having a circular aperture and slots through which said stud and cross pin may pass, and provided in proximity to said slots with arcuate outwardly projecting springs partially severed from said washer and having outwardly curved end portions to engage and limit the movement of said cross pin and having depressions in proximity to said outwardly curved end portions to receive said cross pin and releasably hold the same against counter-rotation.

FORREST G. PURINTON.